US011444709B2

(12) United States Patent
Wendt et al.

(10) Patent No.: US 11,444,709 B2
(45) Date of Patent: Sep. 13, 2022

(54) METHOD OF DETECTING ATMOSPHERIC CONDITIONS IN AN AREA VIA A PLURALITY OF DEVICES

(71) Applicant: SIGNIFY HOLDING B.V., Eindhoven (NL)

(72) Inventors: Matthias Wendt, Würselen (DE); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 182 days.

(21) Appl. No.: 16/893,861

(22) Filed: Jun. 5, 2020

(65) Prior Publication Data

US 2021/0058170 A1    Feb. 25, 2021

Related U.S. Application Data

(60) Provisional application No. 62/890,131, filed on Aug. 22, 2019.

(30) Foreign Application Priority Data

Sep. 5, 2019   (EP) ..................................... 19195545

(51) Int. Cl.
*H04B 17/309*   (2015.01)
*G01W 1/00*   (2006.01)

(52) U.S. Cl.
CPC ............ *H04B 17/309* (2015.01); *G01W 1/00* (2013.01)

(58) Field of Classification Search
CPC ............................. H04B 17/309; G01W 1/00
See application file for complete search history.

(56) References Cited

U.S. PATENT DOCUMENTS 5,468,964 A    11/1995 Gopalsami et al.
10,498,029 B1    12/2019 Tran et al.
(Continued)

FOREIGN PATENT DOCUMENTS

CN    103680161 A    3/2014
JP    2014160979 A    9/2014
(Continued)

OTHER PUBLICATIONS

Matthew Szlazak et al., "Remote Gas Detection Using Millimeter-Wave Spectroscopy for Counter Bio-Terrorism," Biomedical Applications of Micro- and Nanoengineering 2002 (11 Pages).
(Continued)

*Primary Examiner* — Natasha W Cosme (57) ABSTRACT

A method of detecting atmospheric conditions in an area via a plurality of devices, each arranged for transmitting, receiving, and/or processing radio frequency signals in a predetermined frequency band; wherein the radio frequency signals can be affected by atmospheric conditions; wherein the method comprises the steps of: transmitting, by a first device of the plurality of devices, a first radio frequency signal intended for receipt by a second device of the plurality of devices in order to perform a network communications function between the first and the second device during a time period; receiving, by the second device, the transmitted first radio frequency signal; and processing, by the second device, the received first radio frequency signal in order to perform the network communications function; wherein the method further comprises the steps of: selecting a third device, of the plurality of devices, based on a physical location of the third device relative to the area in which the atmospheric conditions are to be detected; receiving the transmitted first radio frequency signal at the third device; and processing, by the third device, the received first radio frequency signal to determine a degree to which the atmo-
(Continued)

spheric conditions in the area have affected the first RF signal.

16 Claims, 4 Drawing Sheets

(56) References Cited

U.S. PATENT DOCUMENTS

| | | |
|---|---|---|
| 2011/0218734 A1 | 9/2011 | Solheim |
| 2014/0172133 A1 | 6/2014 | Snyder |
| 2014/0347074 A1 | 11/2014 | Nadeau |
| 2015/0137703 A1 | 5/2015 | Hartman et al. |
| 2015/0259078 A1 | 9/2015 | Filipovic et al. |
| 2017/0238129 A1* | 8/2017 | Maier .................. H04W 4/029 455/404.2 |
| 2019/0068120 A1 | 2/2019 | Gudeman et al. |

FOREIGN PATENT DOCUMENTS

| | | |
|---|---|---|
| WO | 2015077626 A1 | 5/2015 |
| WO | 2015077644 A1 | 5/2015 |

OTHER PUBLICATIONS

Shuo Liu et al., "Low-Cost Gas Sensors Utilizing MM-Wave Radars," Dept. of Nanotechnology Engineering, Dept. of Electrical and Compute Engineering, Dept. of Chemistry, School of Science, University of Waterloo, Waterloo Canada 2017 (2 Pages).

H.J. Hansen, "Standoff Detection Using Millimeter and Submillimeter Wave Spectroscopy," 2007 (14 Pages).

* cited by examiner

METHOD OF DETECTING ATMOSPHERIC CONDITIONS IN AN AREA VIA A PLURALITY OF DEVICES

FIELD OF THE INVENTION

The invention relates to a method for detecting atmospheric conditions in an area via a plurality of devices. The invention further relates to a system and a computer program product for detecting atmospheric conditions in an area via a plurality of devices.

BACKGROUND

Connected lighting refers to a system of one or more lighting devices which are controlled not by (or not only by) a traditional wired, electrical on-off or dimmer circuit, but rather by using a data communication protocol via a wired or more often a wireless connection, e.g. a wired or wireless network. These connected lighting networks form what is commonly known as Internet of Things (IoT) or more specifically Internet of Lighting (IoL). Typically, the lighting devices, or even individual lamps within a lighting device, may each be equipped with a wireless receiver or transceiver for receiving lighting control commands from a lighting control device according to a wireless networking protocol such as Zigbee, Wi-Fi or Bluetooth.

Recent developments in wireless network technology have resulted in the development of highly reliable, low-cost, and high-performance radios that operate in what used to be the exotic domain of millimeter wave frequency band, comprising band of radio frequency (RF) spectrum between 30 GHz and 300 GHz. The name 'millimeter wave (mm wave)' originates from the fact that the wavelength range of this band is from about 10 mm to less than 1 mm. While much of the millimeter wave spectrum is licensed, a portion around the 60 GHz spectrum can be freely used for communication which now is addressed by the standardization task force IEEE802.11ay.

Communication in many fields is moving to mm-wave in order to escape the crowded 2.4 GHz and 5 GHz spectrum and enable broadband communication. There are many interesting properties of mm-waves which, for example, make it possible to not only communicate over this frequency but also measure air quality.

SUMMARY OF THE INVENTION

The inventors have realized that both RF-based air quality measurement and RF-based network communication can beneficially be provided via a plurality of devices in a wireless network which are spatially distributed in an area. An object of the present invention is to provide an improved air quality detection in an area using the (spatially distributed) plurality of devices.

According to a first aspect, the object is achieved by a method of detecting atmospheric conditions in an area via a plurality of devices, each arranged for transmitting, receiving, and/or processing radio frequency signals in a predetermined frequency band;
wherein the radio frequency signals can be affected by atmospheric conditions;
wherein the method comprises the steps of: transmitting, by a first device of the plurality of devices, a first radio frequency signal intended for receipt by a second device of the plurality of devices in order to perform a network communications function between the first and the second device during a time period; receiving, by the second device, the transmitted first radio frequency signal; and processing, by the second device, the received first radio frequency signal in order to perform the network communications function;
wherein the method further comprises the steps of: selecting a third device, of the plurality of devices, based on a physical location of the third device relative to the area in which the atmospheric conditions are to be detected; receiving the transmitted first radio frequency signal at the third device; and processing, by the third device, the received first radio frequency signal to determine a degree to which the atmospheric conditions in the area have affected the first radio frequency signal.

The method comprises transmitting a first radio frequency signal by a first device and receiving the first radio frequency signal by the second device. The first radio frequency signal is intended for the second device in order to perform a network communication function during a time period. In an example, the first radio frequency signal may comprise a 60 GHz signal and the predetermined frequency band may comprise a millimeter (mm) wave band, for instance from 30 GHz to 300 GHz. The radio frequency signals having a characteristic susceptible to being influence by an atmospheric condition in an area through which said signal travels from the first device transmitting said signal to the second/third device receiving said signal. The first and the second device, of the plurality of devices, may be a part of a communication network and may have, at least during the time period, a communication link between them. A communications link may be the communications channel that connects two or more communicating devices.

A third device, of the plurality of devices, may be selected based on a physical location of the third device relative to the area in which the atmospheric conditions are to be detected. The third device may be located within the area or close to the area. The atmospheric conditions may comprise the state of the atmosphere, e.g. the conditions may comprise the state of the atmosphere in terms of one or more of detecting atmospheric pollutants, detecting gaseous substance in the air, measuring humidity, air moisture, rain, fog, snow etc. Other examples defining atmospheric conditions known to a skilled person are not excluded. The selected third device is arranged for receiving the transmitted first radio frequency signal. In an example, the third device may sniff the first radio frequency signal. Since, the third device is further arranged for processing the received first radio frequency signal to determine a degree to which the atmospheric conditions in the area have affected the first radio frequency signal, the detection of atmospheric conditions along the path of the first radio frequency signal transmission from the first device to the third device is provided. Such detection of the atmospheric conditions may be referred to as RF-based atmospheric conditions detection.

The degree to which the first radio frequency signal has been affected by the atmospheric conditions is related to the detection of the atmospheric conditions. In a simple example, if the first radio frequency is affected, at least a presence (yes/no) of the atmospheric conditions, for instance, atmospheric pollutant may be detected. In a more advanced embodiment, an extent to which the first radio frequency signal is affected determines an amount of the atmospheric conditions (e.g. amount of atmospheric pollutant, for instance, measured in appropriate units).

In an embodiment, the third device, during the time period, may not have a communication link connecting the third device with the first device and/or the second device such that the first radio frequency signal may not be intended for the third device.

In this example, the third device may not have a communication link with the first and/or the second device during the time period. The third device may be a part of the communication network comprising the first and/or the second device, but during the time period, it does not have communication link with the first and/or the second device. The third device may have, during a subsequent time period, a communication link with the first and/or the second device. Alternatively, the third device is not a part of the communication network comprising the first and/or the second device but can receive and process the first radio frequency signal.

In an embodiment, the third device may be arranged for transmitting, in a subsequent time period, information about the detected atmospheric conditions to one or more of the plurality of devices and/or to an external device, not part of the plurality of devices.

The third device may advantageously transmit the information about the detected atmospheric conditions to one or more of the plurality of devices. The information may comprise the degree to which the first radio frequency signal has been affected by the atmospheric conditions. One or more of the plurality of devices may further transmit the detected atmospheric condition to a central server. Additionally, and/or alternatively, the third device may transmit the detected atmospheric conditions to an external device, e.g. a central server device located in the cloud.

In an embodiment, the selection of the third device of the plurality of devices may be further based on the physical location of the third device relative to a physical location of the first and/or the second device.

To further improve the air quality detection in the area, the selection of the third device may be based further on the physical location of the third device relative to a physical location of the first and/or the second device. For example, the selection may be based a coverage range of the transmitted first radio frequency signal, the third device may be selected with a physical location within the coverage range. This is advantageous since if the third device is placed outside the coverage range of the transmitted first frequency signal, the third device may not be able to receive the first radio frequency signal and thus perform processing for detecting atmospheric conditions. In another example, the physical location of the third device may be related to a direction of the transmission of the first radio frequency signal such that third device is located along the direction of the transmission.

In an embodiment, the third device may comprise an airborne device; and wherein the at least one airborne device is selected based on an altitude difference between the selected at least one airborne device and the first and/or the second device.

In case, if the altitude of the area where the atmospheric conditions are to be monitored is higher compared to the altitude of the first and/or the second device, an airborne device may be used for RF-based atmospheric conditions detection. For example, the first device may be arranged for transmitting the first radio frequency signal and the at least one airborne device may be arranged for receiving and/or processing the first signal radio frequency signal for RF-based atmospheric conditions detection.

In an embodiment, the selection of the third device of the plurality of devices may be further based on one or more of: hardware capabilities of the third device, wireless interference close to the third device, altitude of the third device, orientation of the third device.

In this embodiment, some further selection criteria are advantageously defined for the selection of the third device. For instance, participation in RF-based atmospheric conditions detection typically requires receiving wireless messages and/or processing the received wireless messages. This requires additional processing and memory resources and it is therefore beneficial to assess available processing and memory resources as a selection criterion. Wireless interference close to the third device may also be an important factor in selecting the third device. Assessing interference- and reachability-related criteria makes it possible to avoid devices that are likely to suffer or have been determined (e.g. based on historical data) to suffer from wireless interference affecting the device's ability to perform RF-based atmospheric conditions detection. Additionally, or alternatively, based on the to-be-monitored area, the altitude may be an important factor for selecting the third device. For example, the third device mounted at a high altitude, e.g. on a topographic high point in the city or on top of high-rise building may be suitable as it may cover a larger area.

In an embodiment, the method further may comprise the step of: receiving an input during the time period or during a subsequent time period; wherein the input is indicative of a tracking information of an atmospheric pollutants layer with respect to the area; wherein the selection of the third device of the plurality of devices is further based on the tracking information according to the received input.

When an input, which is indicative of the tracking information of an atmospheric pollutants cloud is received at a subsequent time period, the spatial location of the atmospheric pollutants cloud may be different from the spatial location at the previous time period. The selection of the third device may be based on the received input, e.g. the third devices from the plurality of devices, for instance based on the physical location relative to the atmospheric pollutants cloud, may be selected. If a selected third device is no longer in the proximity of the atmospheric pollutants cloud at the subsequent time period, the selected third devices may stop processing the first radio frequency signal.

In an embodiment, the radio frequency signal may be modulated using a broad-band signal modulation technique for network communication.

In this embodiment, the network communication may be using broad-band modulation method, such as orthogonal frequency-division multiplexing (OFDM) to generate a unique mixture of the radio frequency signals. For example, when the first radio frequency signal is generated using the broad spectrum, the atmospheric conditions along the path from the first device to the third device influence the frequency mix characteristically, and thus improves detection quality.

In an embodiment, of the plurality of devices, only the first device may be permitted to transmit, during the time period.

In this embodiment, during the time period only one device of the plurality of devices, e.g. the first device may be permitted to transmit the radio frequency signals. This is advantageous to reduce interference and further improve detection quality.

In an embodiment, the method further may comprise selecting spectral intensity of the predetermined frequency band exceeding a threshold.

In an example, the predetermined frequency band may comprise a dedicated test spectrum with high spectral intensity in the frequencies absorbed by certain pollution or air composition, which may advantageously allow for more detailed analysis for RF-based atmospheric conditions detection.

In an embodiment, the predetermined frequency band may comprise a calibrated test spectrum; wherein the first device may be arranged for transmitting the calibrated test spectrum randomly or periodically or on demand.

In this embodiment, a calibrated test spectrum may be used which allows for an easier and more stable measurement as the typical communication spectra will vary over time. In order not to occupy too much airtime such a calibration spectrum may be transmitted randomly or periodically e.g. once a day. A dedicated spectrum (or even a class of these) may be used for an improved analysis against specific atmospheric conditions or atmospheric pollution. This may for instance be triggered when a normal observation of the spectrum gives a raw indication in order to substantiate this observation in a second measurement cycle optimized for what was suspicious in the first path.

In an embodiment, the plurality of devices may comprise at least one lighting device; and wherein the first radio frequency signal may comprise a lighting control command for controlling the lighting device.

In this advantageous embodiment, the plurality of devices may comprise at least one lighting device, e.g. an outdoor lighting device such as a light pole, or an indoor lighting device. In an outdoor environment, the infrastructure of light poles may be advantageously leveraged to use RF-based atmospheric conditions detection with the RF-based network communications; wherein the RF-based network communications may be used to control a light output of the light poles. For example, the RF-based network communications may be used to control color, color temperature, intensity, beam width, beam direction, illumination intensity, and/or other parameters of one or more of light sources of the at least one lighting device.

According to a second aspect, the object is achieved by a third device for detecting atmospheric conditions in an area; comprising a communication unit arranged for transmitting and/or receiving the radio frequency signals in a predetermined frequency band; a processing unit arranged for processing the radio frequency signals for detecting atmospheric conditions. The processing may comprise determining a degree to which the atmospheric conditions in the area have affected the radio frequency signals.

According to a third aspect, the object is achieved by a system for detecting atmospheric conditions via a plurality of devices in an area; each arranged for transmitting, receiving, and/or processing radio frequency signals in a predetermined frequency band; wherein the radio frequency signals can be affected by the atmospheric conditions; wherein the system comprises: a controller arranged for executing the steps of the method according to the first aspect; the first and the second device according to the first aspect; the third device according to the second aspect.

According to a fourth aspect, the object is achieved by a computer program product comprising instructions which, when the program is executed by a computer, cause the computer to carry out the steps of the method according to the first aspect.

It should be understood that the computer program product, the system and the devices may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of systems, devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Communication in many fields is moving to mm-wave frequency band in order to escape the crowded 2.4 GHz and 5 GHz frequency band spectrum and enable broadband communication. This can for example be the last mile connectivity between the location with optical fiber access, for instance on the roof of a building, and lighting poles which make use of the available data rate not only for lighting controls but e.g. for public Wi-Fi installations, security camera image backhaul or other data intense services.

There are many interesting properties of mm-waves which make it possible to not only communicate over this frequency but also e.g. measure air quality. Millimeter-wave (30-300 GHz) frequency band contains the fundamental rotational resonance frequencies of many molecular gases composed of carbon, nitrogen, oxygen and sulfur. The high specificity of the rotational spectra to organic molecules affords mm-wave spectroscopy having potential use in remotely sensing atmospheric conditions. The detection of airborne chemicals is gaining importance for environmental monitoring. For example, monitoring and/or measuring atmospheric pollutant caused by industrial waste, biodegradable waste etc.

Figure 1:
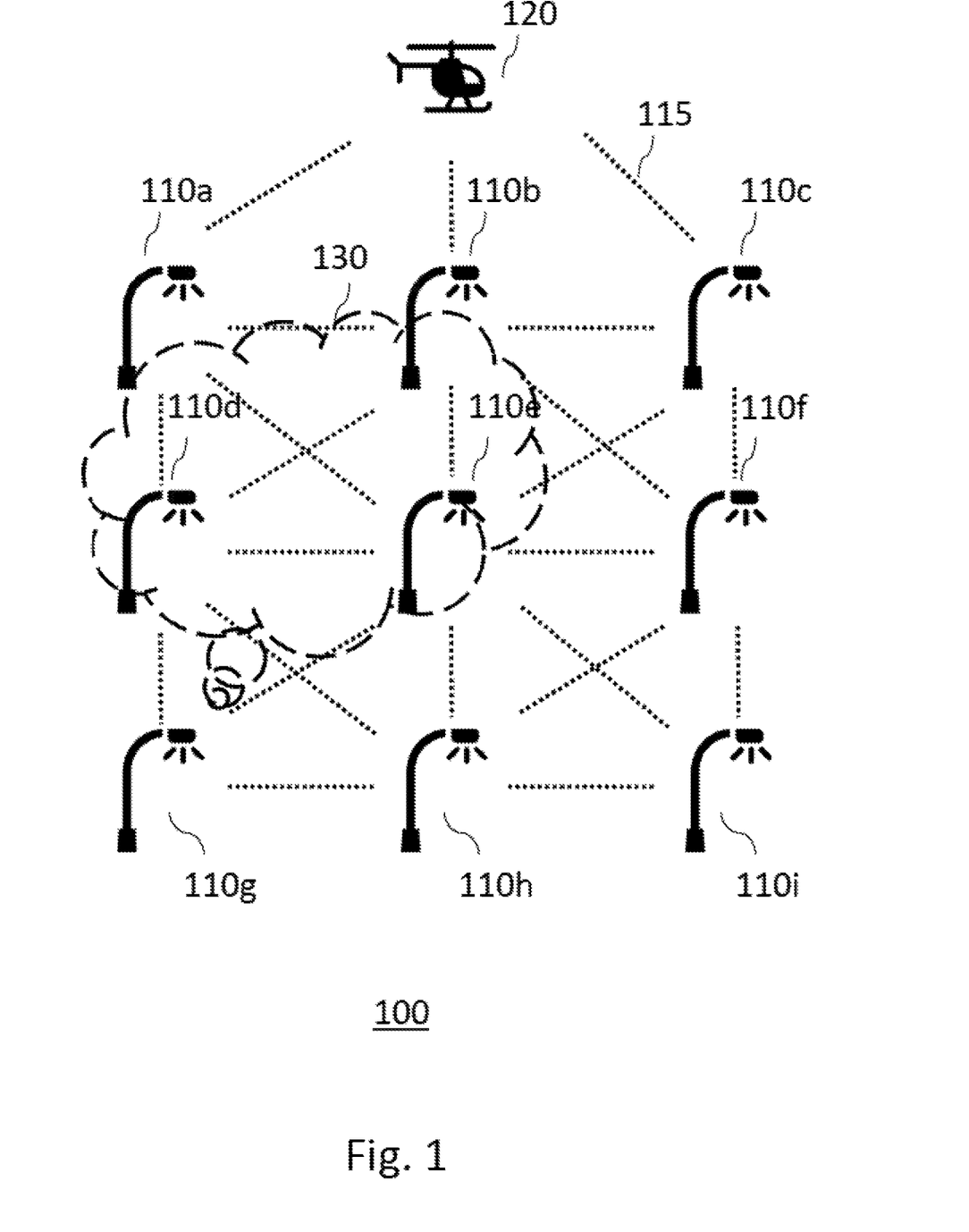
FIG. 1 shows schematically and exemplary an embodiment of a system for detecting atmospheric conditions in an area via a plurality of devices.

FIG. 1 shows schematically and exemplary an embodiment of a system 100 of detecting atmospheric conditions in an area via a plurality of devices 110a-i in a wireless network. Each device 110a-i may be arranged for transmitting, receiving, and/or processing radio frequency signals in a predetermined frequency band, e.g. for RF-based network communications and for RF-based atmospheric conditions detection. The predetermined frequency band may comprise mm-wave frequency band. Millimeter wave (also millimeter band) is the band of spectrum between 30 gigahertz (GHz) and 300 GHz. The radio frequency signals may comprise a 60 GHz signal. The RF-based network communication may comprise 60 GHz Wifi communication (WiGig), 5G technology etc. Any other wireless technology using such mm-waves known in the art is not excluded. The radio frequency signals may possess characteristics which makes them susceptible to be influenced by an atmospheric condition in an area through such that when the first radio frequency signal travels from one device to another in the area, the characteristics are affected and can be observed at the receiving device. For example, the receiving device may process the received first radio frequency signal to determine the effect in the characteristics, and with such determination, the affected characteristics results in atmospheric conditions detection.

In FIG. 1, the plurality of devices 110a-i is exemplary shown as light poles. The plurality of devices 110a-i may be sensor devices, gateways or any other type of device with network communications capabilities. The plurality of devices 110a-i, the light poles in this example, may be connected in a mesh network such that each of the plurality of devices 110a-i have a communication link 115 with a neighboring device 110a-i as shown by the dotted line 115 in FIG. 1. Other network topologies such as star topology may also be possible. In such a (lighting) system 100, the plurality of (lighting) devices are controlled not by (or not only by) a traditional wired, electrical on-off or dimmer circuit, but rather by using a data communications protocol via a wired or more often wireless connection, e.g. a wired or wireless network, e.g. according to a wireless networking protocol such as Zigbee, Wi-Fi or Bluetooth. Therefore, the radio frequency signals may comprise a lighting control command for controlling the (light output of the) lighting device 110a-i.

The atmospheric conditions 130 may comprise the state of the atmosphere. The atmospheric conditions may comprise atmospheric pollutants. Atmospheric pollutants 130 are substances that accumulate in the air to a degree that is harmful to living organisms or to materials exposed to the air. Common atmospheric pollutants 130 include smoke, smog, and gases such as carbon monoxide, nitrogen and sulfur oxides, and hydrocarbon fumes. While gaseous pollutants are generally invisible, solid or liquid pollutants in smoke and smog are easily seen. The atmospheric conditions may comprise rain (rainwater particles), fog, snow etc.

A first/second and/or third device may be selected based on a physical location of the devices 110a-i relative to the area in which the atmospheric conditions 130 are to be monitored. For example, the first device may comprise device 110d which is comprised in the area in which atmospheric conditions 130 are to be monitored. The third device may comprise device 110b whose selection, for instance, may also be based on a physical location of the third device 110b relative to the area of the to-be-detected atmospheric conditions 130. The selection of the third device may be further based on a relative physical location of the third device 110b relative to a physical location of the first and/or the second device 110d. For instance, the relative physical location may be relevant for the first radio frequency signal reachability.

A first device 110d may be arranged for transmitting, during a time period, a first radio frequency signal which can be affected by the atmospheric conditions 130. The first radio frequency signal is intended to be receipt by a second device 110e. The second device 110e may be arranged for receiving and processing the first radio frequency signal for network communication. The third device 110b, which may not have a communication link with the first device 110d, may be then arranged for receiving the first radio frequency signal transmitted by the first device 110d; and processing the received first radio frequency signal to determine a degree to which the atmospheric conditions in the area have affected the first radio frequency signal. The degree to which the first radio frequency signal has been affected may provide detection and monitoring of the atmospheric conditions 130 in the area. For example, the degree to which the first radio frequency signal is affected is related to detecting a presence (yes/no) of an atmospheric pollutant 130, detecting amount of atmospheric pollutants 130 in the atmosphere etc. The atmospheric condition may comprise gaseous substance in the air, humidity, air moisture etc. Gaseous substances in air may shift in concentration due to e.g. effects during sunny days like ozone. Other examples defining atmospheric conditions are not excluded. In an example, the first/second and/or the third device may comprise a set of devices.

The selection of the first/second and/or third device 110d,e,b may be further based on hardware capabilities of the plurality of devices, such as the devices 110a-i with a transceiver to support mm-wave frequency band and a processor to process the mm-wave frequency band may be selected.

Wireless interference close to the devices 110a-i may be an important factor in selecting the first/second and/or third device 110d,e,b because the devices affected by high wireless interference may not be suitable to perform the RF-based atmospheric conditions 130 detection.

Furthermore, based on the to-be-monitored area, the altitude may be considered for selecting the first/second and/or third device 110d,e,b. For example, a device mounted on top of a high-rise building may be a candidate to perform the RF-based atmospheric conditions 130 detection and the RF-based network communications at high altitude to cover a larger area.

The system 110 may further comprise an airborne device 120, wherein the at least one airborne device 120 may be selected as the third device based on an altitude difference between the selected at least one airborne device (the third device) and the first and/or the second device to detect atmospheric conditions 130. In this example, the airborne device 120 is a helicopter, other type of airborne device 120, e.g. drones, UAVs, air balloons etc. may be used. In an alternative example, for performing the RF-based atmospheric conditions 130 detection, the airborne device 120 may be arranged to act as a first device to transmit the first radio frequency signal and the other devices 110d, 110a, 110b, 110e, 110g and 110h may be arranged to act as a receiver to receive the first radio signal and process the received first radio frequency signal for detecting atmospheric conditions 130. In an example, a satellite transmitter may also be used. In such an example of satellite transmitter, the atmospheric conditions such as woodfire or volcano eruptions may be detected with improved accuracy.

The system 100 may comprise a controller (not shown) which may be implemented in a unit separate from the plurality of devices 110a-i, such as wall panel, desktop computer terminal, or even a portable terminal such as a laptop, tablet or smartphone. Alternatively, the controller may be incorporated into the same unit as the plurality of devices 110a-i. Further, the controller may be implemented in the area or remote from the area (e.g. on a server at a different geographical site); and the controller may be implemented in a single unit or in the form of distributed functionality distributed amongst multiple separate units (e.g. a distributed server comprising multiple server units at one or more geographical sites, or a distributed control function distributed amongst the plurality of devices 110a-i). Furthermore, the controller may be implemented in the form of software stored on a memory (comprising one or more memory devices) and arranged for execution on a processor (comprising one or more processing units), or the controller may be implemented in the form of dedicated hardware circuitry, or configurable or reconfigurable circuitry such as a PGA or FPGA, or any combination of these.

In an example, the atmospheric conditions 130 may be an atmospheric pollutants layer, e.g. a pollutant cloud such as toxication in air. An example of pollutant cloud is atmospheric brown cloud, which is created by a range of airborne particles and pollutants from combustion (e.g., woodfires, cars, and factories), biomass burning and industrial processes with incomplete burning. During the time period, the atmospheric detection is performed by the set of devices (e.g. the first/second and the third device).

At a subsequent time period, the spatial location of the atmospheric pollutant 130 may change with respect to the area in a direction (not shown). The atmospheric pollutants cloud 130 may move, expand or shrink over time. An input comprising the tracking information may be received at the subsequent time period. The input comprising the tracking information may be generated by the (wireless) network comprising the plurality of devices 110a-i or by an external network. The tracking information may comprise the spatial location of the (moving/expanding/shrinking) atmospheric pollutants 130 with respect to the area. Based on the received input, the selected subset of devices (first/second and/or the third device) may be modified.

Figure 2:
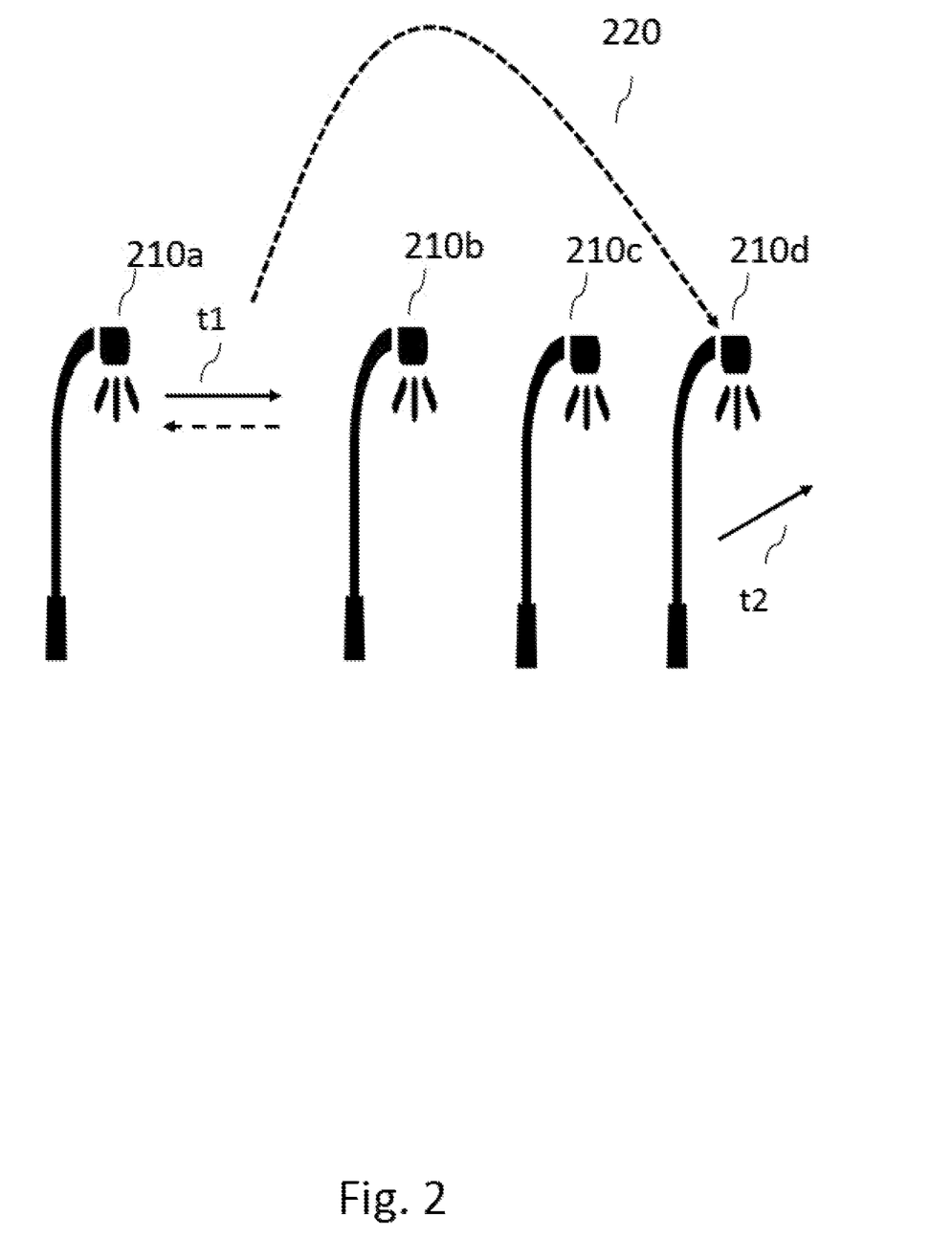
FIG. 2 shows schematically and exemplary an embodiment of a method for detecting atmospheric conditions in an area via a plurality of devices.

FIG. 2 shows schematically and exemplary an embodiment of a method for detecting atmospheric conditions in an area via a plurality of devices 210a-d. During a time period t1, a first device 210a may transmit a first radio frequency signal intended for receipt by a second device 210b in order to perform a network communications function between the first 210a and the second device 210b. The network communication function may comprise a set of (communication) protocols that allow a plurality of devices 210a-d to communicate with each other and exchange data (e.g. information packets) without regard to the hardware and operating systems. The transmitted first radio frequency signal may be received by the second device 210b; and processed by the second device 210b in order to perform the network communications function. In an example, the second device 210b may also transmit radio frequency signal intended for the first device 210 (shown by the dotted line). The transmission and reception may be performed during the time period t1. In this exemplary figure, the plurality of devices 210a-d comprise light poles, and the first radio frequency signal may comprise a lighting control command for controlling (a light output of) the light pole.

A third device 210d may be arranged for receiving the transmitted first radio frequency signal. In an example, during the time period t1, the third device 210d does not have a communication link with the first 210a and/or the second 210b device. The third device 210d may not be involved in communication with the first device 210a, at least such that the first radio frequency signal is not intended for receipt by the third device 210d. The third device 210d, in an example, may sniff the first radio frequency signal. The third device 210d may receive the first radio frequency signal along a path 220. The third device 210d may process, during the time period t1 and/or in a subsequent time period, the received first radio frequency signal to determine the atmospheric conditions in the area.

In an example, dependent on whether beam forming is used, the transmission from the second device 210b to the first device 210a may not be easily receivable at the third device 210d as the beam forming antenna focuses radio frequency energy into the direction of the first device 210a. However, when the first 210a/second 210b and the third device 210d are located, e.g. in a line, the first radio frequency signal transmitted from the first device 210a towards the second device 210b will be receivable with typical attenuation dependent on the atmospheric conditions and distance.

In an example, the (first) radio frequency signal may be modulated using a broad-band signal modulation technique for the network communication. For example, if the network communication is using broad spectrum methods like OFDM, the first radio frequency signal with a unique mixture of frequencies may be generated. The first radio frequency signal as received by the second device 210b may not be influenced by the atmospheric conditions so much. Normally, these network communication techniques simply use frequency compositions which are not too low in transmission in order to keep SNR high.

But as the first radio frequency signal has to pass, e.g. a much longer distance 220 to the third device 210d, the transmission properties may influence the first radio frequency signal characteristically. When the third device 210d is aware of the original spectral composition of the first radio frequency signal and the composition as monitored by surrounding plurality of devices 210a-d, the determination of atmospheric conditions such as certain resonating molecule densities, can be deduced using the first radio frequency signal, and even without generating actively a test radio frequency signal.

In an example, the first radio frequency signal, e.g. the spectral composition of the first radio frequency signal, received at the second device 210b (or at another device 210c in the plurality of devices) will be compared with the received first radio frequency signal at the third device 210d to generate the frequency dependent attenuation. The third device 210d may process the received first radio frequency signal to determine a degree to which the atmospheric conditions in the area have affected the first radio frequency signal. The distance factor influencing the received first radio frequency signal may be taken from installation maps during installation to determine the effect by the atmospheric conditions.

In an example, when the third device 210d comprises a set of devices (not shown) spectral compositions may be collected from the set of devices at a central server (not shown). Here the correlated packet spectra may be processed. Differences in spectral composition may be used to determine the atmospheric conditions. Alternative to using a central server, one of the devices from the selected set of third devices may be used to perform the processing.

The third device 210d may be arranged for transmitting, in a subsequent time period t2, information about the detected atmospheric conditions to one or more of the plurality of devices 210a-d and/or to an external device (not shown), not part of the plurality of devices. The external device may be a central server.

Figure 3:
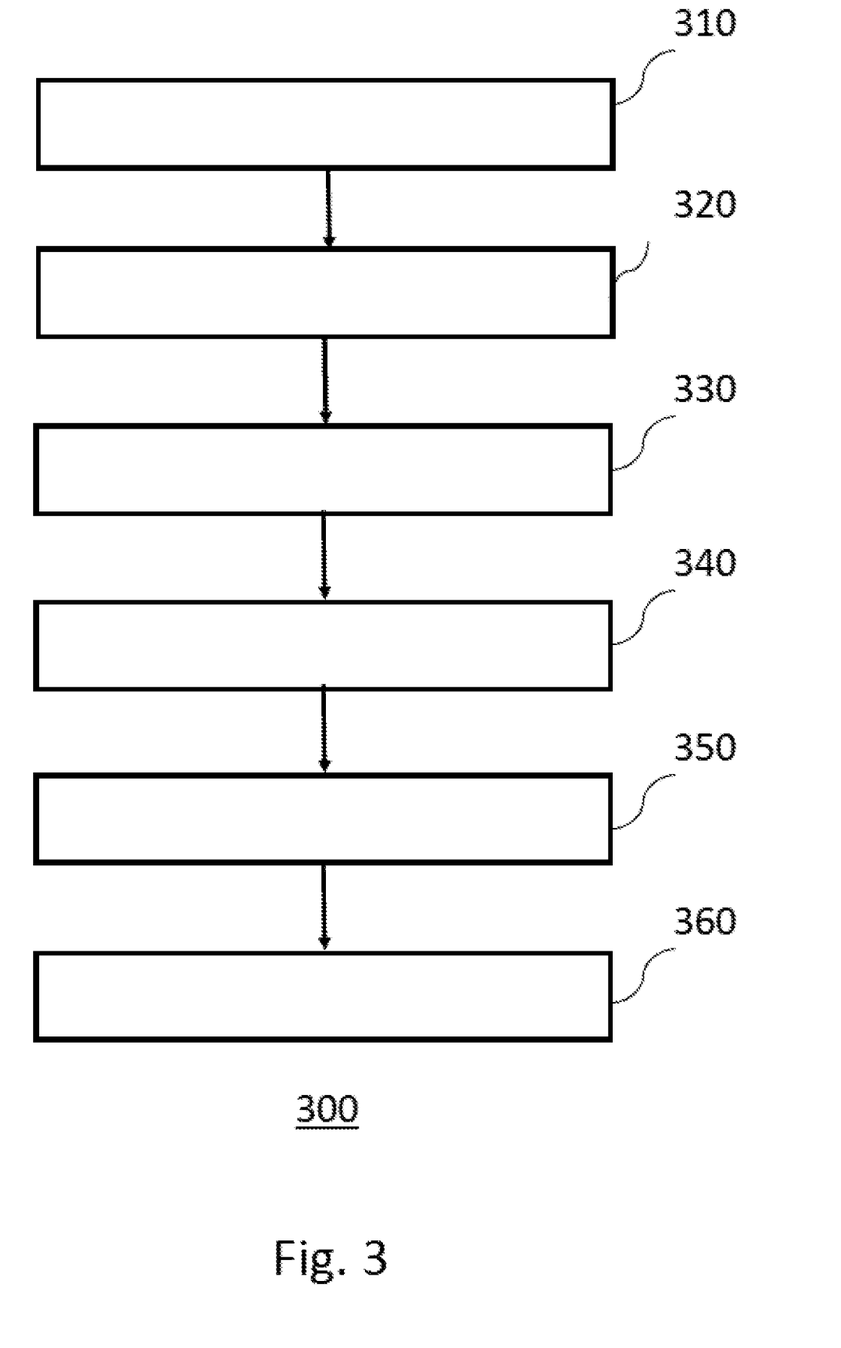
FIG. 3 shows schematically and exemplary a flowchart illustrating a method for detecting atmospheric conditions in an area via a plurality of devices.

FIG. 3 shows schematically and exemplary a flowchart illustrating a method 300 for detecting atmospheric conditions in an area via a plurality of devices 110a-i, each device 110a-i may be arranged for transmitting, receiving, and/or processing radio frequency signals in a predetermined frequency band. The radio frequency signals may be affected by the atmospheric condition. For example, the predetermined frequency band may comprise mm-wave frequency band and the radio frequency signals may comprise a 60 GHz signal. Millimeter waves occupy the frequency spectrum from 30 GHz to 300 GHz. They're found in the spectrum between microwaves (1 GHz to 30 GHz) and infrared (IR) waves, which is sometimes known as extremely high frequency (EHF). The wavelength ($\lambda$) is in the 1-mm to 10-mm range. The method 300 may comprise the steps of transmitting 310, by a first device 110d, 210a of the plurality of devices 110a-i, 210a-d a first radio frequency signal intended for receipt by a second device 110e, 210b of the plurality of devices 110a-i, 210a-d in order to perform a network communications function between the first 110d, 210a and the second 110e, 210b device during a time period t1. The method 300 may further comprise receiving 320, by the second device 110e, 210b the transmitted first radio frequency signal; and processing 330, by the second device 110e, 210b the received first radio frequency signal in order to perform the network communications function. To improve accuracy of detection of atmospheric conditions, only the first device 110d, 210a may be permitted to transmit, during the time period t1.

In an example, spectral intensity of the predetermined frequency band may be selected to exceed a threshold. Such high spectral intensity in the frequencies absorbed by certain pollution or air composition may allow for more detailed analysis. This will allow to intensify radio frequency energy in interesting frequencies and may be observed even in increased distance. In an example, such a spectral composition may be generated only on demand if first results ask for more detailed information. In another example, such spectral composition bursts can be precalculated data packets. In another example, the spectral composition at the first device 110d, 210a may be predetermined and known, e.g. to plurality of devices also allowing for the processing 360 at the third device 110b, 210d.

In an example, the predetermined frequency band may comprise a calibrated test spectrum; wherein the first device 110d, 210a may be arranged for transmitting the calibrated test spectrum randomly or periodically. The calibrated test spectrum may allow for an easier and more stable measurement as the typical communication spectra will vary over time. In order not to occupy too much airtime such a calibration spectrum may be transmitted only rarely e.g. once a day.

The method 300 may further comprise the steps of selecting 340 a third device 110b, 210d, of the plurality of devices 110a-i, 210a-d, based on a physical location of the third device 110b, 210d relative to the area in which the atmospheric conditions 130 are to be detected. The selection may be further based on radio frequency reachability of the first radio frequency signal, e.g. based on the physical location of the third device 110b, 210d relative to the first/second device. The method 300 may further comprise receiving 350 the transmitted first radio frequency signal at the third device 110b, 210d; and processing 360, by the third device 110b, 210d, the received first radio frequency signal to determine a degree to which the atmospheric conditions 130 in the area have affected the first radio frequency signal. The extent to which the first radio frequency signal has been affected is proportional, e.g. to the detection of the atmospheric conditions 130. In an example, more than one third device 110b, 210d are selected 340. In another example, (all) devices having a physical location comprised in or in proximity to the area in which the atmospheric conditions are to be detected are selected 340. Additionally, and/or alternatively to the previous example selection 340, (all) devices which can receive the transmitted first radio signal (e.g. with sufficient signal strength to process 360 the signal) are selected 340.

Figure 4:
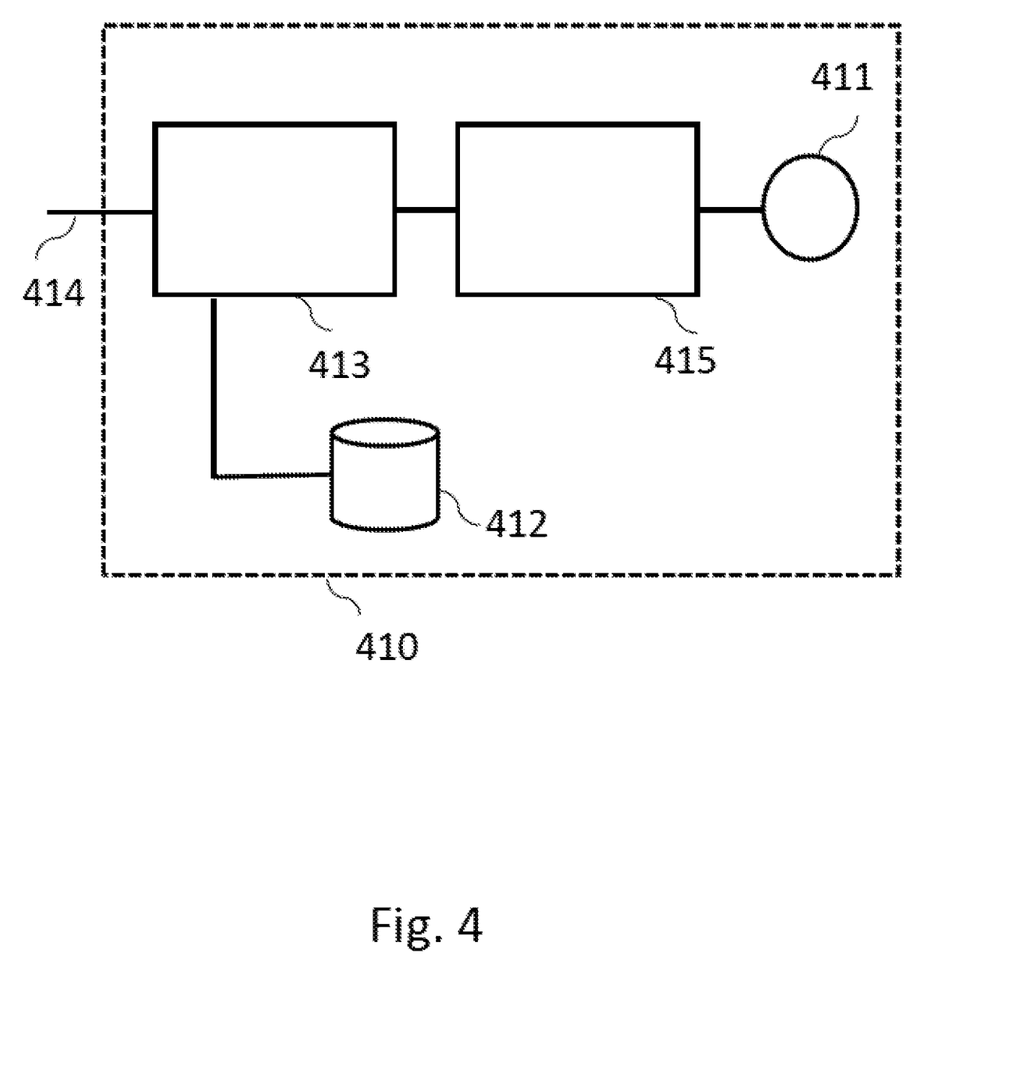
FIG. 4 shows schematically and exemplary a device to for detecting atmospheric conditions in an area.

FIG. 4 shows schematically and exemplary a (third) device for detecting atmospheric conditions in an area. As an example, the (third) device 410 is shown to be a lighting device or a luminaire with a light source 411. A luminaire 410 is a device or structure arranged to emit light suitable for illuminating an environment, providing or substantially contributing to the illumination on a scale adequate for that purpose. A luminaire 410 comprises at least one light source 411 or lamp, such as an LED-based lamp, gas-discharge lamp or filament bulb, etc., and optionally any associated support, casing or other such housing. Each of the luminaires 410 may take any of a variety of forms, e.g. a ceiling mounted luminaire, a wall-mounted luminaire, a wall washer, or a free-standing luminaire (and the luminaires need not necessarily all be of the same type), outdoor light pole etc.

The (third) device 410 may comprise a communication unit 413 which may be arranged for transmitting and/or receiving radio frequency signals in a predetermined frequency band. The communication unit 413 allows the device to communicate with other devices 110a-i, 210a-d and/or a central controller (not shown) such as a lighting controller and/or Building Management System (BMS) via an input/output interface unit 414. The communication unit 413 may comprise a wireless transceiver and may provide communication over radio frequency, using a protocol such as Wi-Fi (including 60 GHz WiGig), Bluetooth or Zigbee. The input/output interface 414 may be used to receive an input at a subsequent time period; wherein the input is indicative of a tracking information of an atmospheric pollutants layer with respect to the selected subset of devices.

The device 410 may comprise a memory unit 412, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. The memory unit 412 may be arranged for storing the received first radio frequency signal for RF-based atmospheric conditions detection.

The device 410 may comprise a processing unit 415 which is arranged for processing the first radio frequency signal. Some of the steps of the method 300 may be executed the processing unit 415 of the (third) device 410.

The method 300 may be executed by computer program code of a computer program product when the computer program product is run on a processing unit of a computing device, such as the controller of the system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of detecting atmospheric conditions in an area via a plurality of devices, each arranged for at least one or more of transmitting, receiving, or processing radio frequency signals in a predetermined frequency band; wherein the radio frequency signals can be affected by atmospheric conditions; the method comprises the steps of:
 transmitting, by a first device of the plurality of devices, a first radio frequency signal intended for receipt by a second device of the plurality of devices in order to perform a network communications function between the first and the second device during a time period;
 receiving, by the second device, the transmitted first radio frequency signal;
 processing, by the second device, the received first radio frequency signal in order to perform the network communications function;
 selecting a third device, of the plurality of devices, based on a physical location of the third device relative to the area in which the atmospheric conditions are to be detected;
 receiving the transmitted first radio frequency signal at the third device; and
 processing, by the third device, the received first radio frequency signal to determine a degree to which the atmospheric conditions in the area have affected the first radio frequency signal;
 wherein the predetermined frequency band comprises a calibrated test spectrum, and the first device is arranged for transmitting the calibrated test spectrum at least ore or more of randomly, periodically, or on demand.

2. The method according to claim 1, wherein the third device, during the time period, does not have a communication link connecting the third device with at least one or both of the first device or the second device such that the first radio frequency signal is not intended for the third device.

3. The method according to claim 1, wherein the third device is arranged for transmitting, in a subsequent time period, information about the detected atmospheric conditions to at least one or more of the plurality of devices or an external device, not part of the plurality of devices.

4. The method according to claim 1, wherein the selection of the third device of the plurality of devices is further based on the physical location of the third device relative to a physical location of at least one or both of the first or the second device.

5. The method according to claim 1, wherein the third device comprises an airborne device; and wherein the at least one airborne device is selected based on an altitude difference between the selected at least one airborne device and at least one or both of the first or the second device.

6. The method according to claim 1, wherein the selection of the third device of the plurality of devices is further based on one or more of: hardware capabilities of the third device, wireless interference close to the third device, altitude of the third device, orientation of the third device, currently available processing power, standby power preferences of the third device.

7. The method according to claim 1, wherein the method further comprises the step of:
 receiving an input during the time period or during a subsequent time period; wherein the input is indicative of a tracking information of an atmospheric pollutants layer with respect to the area;
 wherein the selection of the third device of the plurality of devices is further based on the tracking information according to the received input.

8. The method according to claim 1, wherein the radio frequency signal is modulated using a broad-band signal modulation technique for the network communication.

9. The method according to claim 1, wherein of the plurality of devices, only the first device is permitted to transmit, during the time period.

10. The method according to claim 1, wherein the method further comprises:
 selecting spectral intensity of the predetermined frequency band exceeding a threshold.

11. The method according to claim 1, wherein the plurality of devices comprises at least one lighting device; and wherein the first radio frequency signal comprises a lighting control command for controlling the lighting device.

12. A system for detecting atmospheric conditions via a plurality of devices in an area; each arranged for at least one or more of transmitting, receiving, or processing radio frequency signals in a predetermined frequency band; wherein the radio frequency signals can be affected by the atmospheric conditions; the system comprises:
 a controller arranged for executing the steps of the method according to claim 1, and
 a third device for detecting atmospheric conditions in an area,
 the third device including a communication unit arranged for at least one or both of transmitting or receiving the radio frequency signals in a predetermined frequency band, and the third device including
 a processing unit arranged for processing the radio frequency signals for detecting atmospheric conditions.

13. A system for detecting atmospheric conditions via a plurality of devices in an area; each arranged for at least one or more of transmitting, receiving, or processing radio frequency signals in a predetermined frequency band; wherein the radio frequency signals can be affected by the atmospheric conditions; the system comprises:
 a controller arranged for executing the steps of the method according to claim 1,
 a first and a second device of the plurality of devices, and
 a third device comprising:
  a communication unit arranged for at least one or both of transmitting or receiving the radio frequency signals in a predetermined frequency band, and
  a processing unit arranged for processing the radio frequency signals for detecting atmospheric conditions.

14. A non-transitory computer-readable storage device with computer-executable instructions stored thereon that, when executed by one or more computer processors, cause the one or more computer processors to perform operations configured to carry out the steps of the method of claim 1.

15. A method of detecting atmospheric conditions in an area via a plurality of devices, each arranged for at least one or more of transmitting, receiving, or processing radio frequency signals in a predetermined frequency band; wherein the radio frequency signals can be affected by atmospheric conditions; the method comprises the steps of:
- transmitting, by a first device of the plurality of devices, a first radio frequency signal intended for receipt by a second device of the plurality of devices in order to perform a network communications function between the first and the second device during a time period;
- receiving, by the second device, the transmitted first radio frequency signal;
- processing, by the second device, the received first radio frequency signal in order to perform the network communications function;
- selecting a third device, of the plurality of devices, based on a physical location of the third device relative to the area in which the atmospheric conditions are to be detected;
- receiving the transmitted first radio frequency signal at the third device; and
- processing, by the third device, the received first radio frequency signal to determine a degree to which the atmospheric conditions in the area have affected the first radio frequency signal;
- wherein the third device, during the time period, does not have a communication link connecting the third device with at least one or both of the first device or the second device such that the first radio frequency signal is not intended for the third device.

16. A method of detecting atmospheric conditions in an area via a plurality of devices, each arranged for at least one or more of transmitting, receiving, or processing radio frequency signals in a predetermined frequency band; wherein the radio frequency signals can be affected by atmospheric conditions; the method comprises the steps of:
- transmitting, by a first device of the plurality of devices, a first radio frequency signal intended for receipt by a second device of the plurality of devices in order to perform a network communications function between the first and the second device during a time period;
- receiving, by the second device, the transmitted first radio frequency signal;
- processing, by the second device, the received first radio frequency signal in order to perform the network communications function;
- selecting a third device, of the plurality of devices, based on a physical location of the third device relative to the area in which the atmospheric conditions are to be detected;
- receiving the transmitted first radio frequency signal at the third device;
- processing, by the third device, the received first radio frequency signal to determine a degree to which the atmospheric conditions in the area have affected the first radio frequency signal; and
- receiving an input during the time period or during a subsequent time period; wherein the input is indicative of a tracking information of an atmospheric pollutants layer with respect to the area;
- wherein the selection of the third device of the plurality of devices is further based on the tracking information according to the received input.

\* \* \* \* \*